United States Patent [19]

Müller et al.

[11] Patent Number: 5,256,726

[45] Date of Patent: Oct. 26, 1993

[54] REACTIVE SYSTEMS AND A PROCESS FOR THE PREPARATION OF POLYURETHANE PLASTICS

[75] Inventors: Hanns-Peter Müller, Bergisch Gladbach; Joachim Franke, Cologne; Renate Bulan, Langenfeld, all of Fed. Rep. of Germany

[73] Assignee: Bayer Aktiengesellschift, Leverkusen, Fed. Rep. of Germany

[21] Appl. No.: 760,047

[22] Filed: Sep. 13, 1991

[30] Foreign Application Priority Data

Sep. 21, 1990 [DE] Fed. Rep. of Germany ....... 4029888

[51] Int. Cl.$^5$ ............................ C08J 9/00; C08K 5/01; C08L 75/00; C08G 18/00
[52] U.S. Cl. ..................... 524/589; 521/121; 521/131; 521/156; 528/73
[58] Field of Search .................. 528/73; 521/121, 131, 521/156; 524/589

[56] References Cited

U.S. PATENT DOCUMENTS

| | | | |
|---|---|---|---|
| 4,182,826 | 1/1980 | Lüdke et al. | 528/57 |
| 5,003,004 | 3/1991 | Simms | 524/91 |
| 5,021,536 | 6/1991 | Müller et al. | 528/73 |

FOREIGN PATENT DOCUMENTS 3836598  5/1990  Fed. Rep. of Germany .

*Primary Examiner*—Paul R. Michl
*Assistant Examiner*—Patrick Niland
*Attorney, Agent, or Firm*—Joseph C. Gil; Godfried R. Akorli

[57] ABSTRACT

Reactive systems comprising of a specific polyisocyanate component and a reactive component for this polyisocyanate component, as well as non-reactive plasticizers and if appropriate other auxiliaries and additives, and a process for the preparation of polyurethane plastics containing isocyanurate groups using this reactive system.

7 Claims, No Drawings

REACTIVE SYSTEMS AND A PROCESS FOR THE PREPARATION OF POLYURETHANE PLASTICS

BACKGROUND OF THE INVENTION

The present invention relates to new reactive systems comprising a specific polyisocyanate component and a reactive component for this polyisocyanate component, as well as non-reactive plasticizers and if appropriate other auxiliaries and additives, and to a process for the preparation of polyurethane plastics containing isocyanurate groups using this reactive system.

The invention furthermore relates to new reactive systems which give two- or multi-phase shaped articles of good toughness, rigidity and heat stability after hardening.

The preparation of plastics containing isocyanurate groups has been known for years and is utilized industrially in diverse forms. DE-OS (German Published Specification) 2,534,247 thus describes, for example, a process for the preparation of moldings based on isocyanurate-modified polyurethanes using strongly basic compounds, such as, for example, alkali metal acetates or alkali metal phenolates, as trimerization catalysts.

Reactive systems which are based on epoxide/isocyanate (EPIC) components are described in a previous application by the applicant company in accordance with P 3 836 598.7. EPIC plastics (and epoxy resin) have good processing and hardening properties, and on hardening they give shaped articles of good mechanical strength, resistance to chemicals, and high glass transition temperatures, and undesirably high brittleness.

The invention was thus based on the object of developing EPIC resins which give shaped articles of improved toughness on hardening, can be processed as 2C materials, the metering of which causes hardly any mixing errors and which harden without noticeable shrinkage.

SUMMARY OF THE INVENTION

It has now been found, surprisingly, that these objects are achieved by a process in which mixtures of:

a) a storage-stable mixture of (i) a polyisocyanate component comprising at least one organic polyisocyanate and (ii) an epoxide component comprising at least one organic epoxide, the storage stability having been ensured by a heat treatment of the epoxide component (ii) in the presence of an alkylating agent, and optionally (if appropriate) carried out in the presence of at least some of the polyisocyanate component (i), and the ratios of the amounts of components (i) and (ii) being chosen so that 0.005 to 0.4 mol of epoxide groups is present in 100 (grams) g of component a), and b) an NCO-reactive component comprising of at least one organic compound which contains at least two groups which are reactive towards isocyanate groups in the sense of (via) an addition reaction and has an OH number range from 28 to 1800, preferably 300 to 800, with the proviso that at least 10 percent by weight of component b) comprises a compound containing at least 0.05 mol of tertiary amine nitrogen per 100 g, c) plasticizers, with the proviso that at least one of the plasticizers forms a two-phase or multi-phase system in the hardened state and is employed in an amount of not more than 200 percent by weight, based on the reactive resin.

This phenomenon is surprising and was not foreseeable to the expert since plasticizers give shaped articles of good toughness and at the same time high rigidity after hardening. It is advantageous that in the embodiments of the invention, errors in mixing the two components can be compensated for within wide limits.

The present invention further relates to reactive systems comprising:

a) a storage-stable mixture of (i) a polyisocyanate component comprising at least one organic polyisocyanate and (ii) an epoxide component comprising at least one organic epoxide, the storage stability having been ensured by a heat treatment of the epoxied component (ii) in the presence of an alkylating agent, and optionally (if appropriate) carried out in the presence of at least some of the polyisocyanate component (i), and the ratios of the amounts of components (i) and (ii) being chosen so that 0.005 to 0.4 mol of epoxide groups is present in 100 g of component a), b) an NCO-reactive component comprising at least one organic compound which contains at least two groups which are reactive towards isocyanate groups in the sense of (via) an addition reaction and has an OH number range from 28 to 1800, preferably 300 to 800, with the proviso that at least 10 by weight of component b) comprises of compounds comprising at least 0.05 mol of tertiary amine nitrogen per 100 g, and c) plasticizers with the proviso that at least one of the plasticizers forms a two(multi)-phase system in the hardened stage and is employed in an amount of not more than 200 percent by weight, based on the reactive resin, and optionally (if appropriate)

d) other auxiliaries and additives, the amount of component optionally (if appropriate) b) being chosen so that 0.1 to 0.95 groups of component b) which are reactive towards isocyanate groups are present per isocyanate group of component a).

The invention also relates to a process for the preparation of optionally foamed polyurethane plastics containing isocyanurate groups, characterized in that the reactive system comprises:

a) a storage-stable mixture of (i) a polyisocyanate component comprising at least one organic polyisocyanate and (ii) an epoxide component comprising at least one organic epoxide, the storage stability having been ensured by a heat treatment of the epoxide component (ii) in the presence of an alkylating agent, optionally (if appropriate) carried out in the presence of at least some of the polyisocyanate component (i), and the ratios of the amounts of components (i) and (ii) being chosen so that 0.005 to 0.4 mol of epoxide groups is present in 100 g of component a), b) an NCO-reactive component comprising at least one organic compound which contains at least two groups which are reactive towards isocyanate groups in the sense of (via) an addition reaction and has an OH number range from 28 to 1800, preferably 300 to 800, with the proviso that at least 10 percent by weight of component b) comprises of compounds comprising at least 0.05 mol of tertiary amine nitrogen per 100 g, and c) plasticizers, with the proviso that at least one of the plasticizers forms a two-phase or multi-phase system in the hardened employed in an amount of not more than 200 percent by weight, based on the reactive resin, and optionally (if appropriate)

d) other auxiliaries and additives, the amount of component b) being chosen so that 0.1 to 0.95 groups of component b) which are reactive towards isocyanate groups are present per isocyanate group of component a). The foam is prepared by mixing the individual components; the resultant mixture is subsequently heated to at least 60° C., if appropriate while shaping, by supplying heat and/or by utilizing the heat of reaction of the polyurethane formation reaction which immediately proceeds, and the hardening is brought to completion. Some of the isocyanate groups present in the starting mixture are trimerized.

In a preferred embodiment, component a) is converted in the presence of a tertiary amine as the catalyst into a more viscous intermediate product containing oxazolidinone and isocyanurate groups, and the reaction is interrupted at a conversion of not more than 65% of the isocyanate groups present in the starting mixture by addition of an amount at least equivalent to the amount of amine of the alkylating sulphonic acid alkyl ester, of methyl iodide or of dimethyl sulphate. The still liquid intermediate product thus obtained is then reacted with components b) c) and optionally (if appropriate) d).

Component a) of the reactive systems according to the invention comprises mixtures of (i) a polyisocyanate component and (ii) an epoxide component, the latter being stabilized by a heat treatment in the presence of an alkylating agent so that a spontaneous reaction between the isocyanate groups and the epoxide groups, for example in the sense of U.S. Pat. No. 4,766,158, is suppressed.

DETAILED DESCRIPTION OF THE INVENTION

The polyisocyanate component (i) comprises of at least one organic polyisocyanate of the type known per se from polyurethane chemistry. Possible polyisocyanates are, for example, hexamethylene diisocyanate, the isomeric xylylenediisocyanates, 4,4'-diisocyanatodicyclohexylmethane, 2,4- and/or 2,6-diisocyanatotoluene and 4,4'-diisocyanatodiphenylmethane and mixtures thereof with 2,4'-diisocyanatodiphenylmethane and if appropriate small amounts of 2,2'-diisocyanatodiphenylmethane and/or with its higher homologues. As is known, such mixtures are formed during phosgenation, which is known per se, of aniline-formaldehyde condensates. Other possible polyisocyanates are urethane- and/or carbodiimide- and/or uretdione- and/or isocyanurate- and/or biuret-modified derivatives of these polyisocyanates. Polyisocyanate component (i) is preferably at least one aromatic polyisocyanate. Polyisocyanates or polyisocyanate mixtures of the diphenylmethane series which are liquid at room temperature or derivatives of these polyisocyanates or polyisocyanate mixtures which are liquid at room temperature are particularly suitable. Polyisocyanate component (i) in general has an NCO content of 15 to 50 by weight, preferably 22 to 32 by weight.

The epoxide component (ii) is at least one organic epoxide, that is to say preferably at least one organic compound which contains 1 to 4, in particular 1 or 2, epoxide groups per molecule at an epoxide equivalent weight of 70 to 500, preferably 170 to 220. Suitable epoxides are monoepoxides, such as, for example, phenoxypropylene oxide, styrene oxide or glycidyl alcohol, or polyepoxides of higher functionality, such as, for example, polyglycidyl ethers of polyhydric phenols, in particular of bisphenol A; polyepoxide compounds based on aromatic amines, in particular bis(N-epoxypropyl)aniline, N,N'-dimethyl-N,N'-diepoxypropyl-4,4'-diamino diphenylmethane and N-diepoxypropyl-4-aminophenyl glycidyl ether; and polyglycidyl esters of cycloaliphatic dicarboxylic acids, in particular diglycidyl hexahydrophthalate, and polyepoxides of the reaction product of n mol of hexahydrophthalic anhydride and 1 mol of a polyol having n hydroxyl groups (n=an integer from 2-6), in particular 3 mol of hexahydrophthalic anhydride and 1 mol of 1,1,1-trimethylolpropane, 3,4-epoxycyclo hexylmethane-3,4-epoxycyclohexanecarboxylate.

The epoxides (ii) which are present in component a) according to the invention are inhibited, that is to say they are in a stabilized form with respect of their reactivity towards isocyanate groups. The stabilization of the epoxides is carried out by means of a heat treatment at 30° to 150° C., preferably 80° to 130° C., in the presence of an alkylating agent, which is in general employed in an amount of 0.005 to 1 by weight, preferably 0.05 to 0.25 by weight, based on the weight of the epoxide. The heat treatment is in general carried out over a period of 15 to 60 minutes, and can take place both in the absence of the polyisocyanate component (i) and in the presence of at least some of this component. This means that the addition of the alkylating agent and also the subsequent heat treatment can take place either before the epoxide is combined with the polyisocyanate or after the epoxide and at least some of the polyisocyanate have been mixed.

Examples of suitable alkylating agents are methyl iodide, dimethyl sulphate or, preferably, sulphonic acid alkyl esters of the molecular weight range from 110 to 250 having 1 to 4 carbon atoms in the alkyl radical. These include both aliphatic sulphonic acid alkyl esters, such as methyl n-butanesulphonate, methyl n-perfluorobutanesulphonate and ethyl n-hexanesulphonate, and aromatic sulphonic acid alkyl esters, such as methyl, ethyl or n-butyl benzenesulphonate, methyl, ethyl or m-butyl p-toluenesulphonate, methyl 1-naphthalenesulphonate, methyl 3-nitrobenzenesulphonate or methyl 2-naphthalene-sulphonate. The aromatic sulphonic acid esters mentioned as examples are preferred. Methyl p-toluenesulphonate is particularly preferably used.

The epoxides (ii ) are present in component a) in an amount such that 0.005 to 0.15, preferably 0.01 to 0.05, mol of epoxide groups is present per 100 g of component a).

Component b) of the systems according to the invention comprises at least one organic compound of molecular weight range from 62 to 12000, preferably 62 to 6000, which has 2 to 8, preferably 2 to 4, groups which are reactive towards isocyanate groups. They are preferably aromatic primary amino groups or hydroxyl groups, and more preferably aliphatic hydroxyl groups, with the proviso that at least 10 by weight of component b) comprises of compounds which contain at least 0.05 mol of ternary amine nitrogen per 100 grams.

Compounds which are suitable as component b) or some of component b) are both low molecular weight polyhydric alcohols (molecular weight range from 62 to 400), such as ethylene glycol, diethylene glycol, 1,4- dihydroxybutane, 1,6-dihydroxyhexane, trimethylolpropane, glycerol, 1,6-dihydroxyhexane, trimethylolpropane, glycerol, pentaerythritol, sorbitol or sucrose, and higher molecular weight polyhydroxy compounds (molecular weight range from 400 to 12000, preferably 400 to 6000), such as, for example, polyhydroxypolyethers of the type known per se from polyurethane chemistry, such as are accessible by alkoxylation of suitable starter molecules, such as the polyhydric alcohols mentioned as examples, or of ammonia or amines, such as ethylenediamine, hexamethylenediamine, 2,4-diaminotoluene, aniline or amino-alcohols, such as methyl-diethanol-amine or triethanolamine, using propylene oxide and/or ethylene oxide in any desired sequence of these alkylene oxides in a manner which is known per se. Compounds which are furthermore suitable are polyester-polyols such as are accessible by reaction of the low molecular weight alcohols mentioned as examples with polybasic carboxylic acids, such as adipic acid, phthalic acid, hexahydrophthalic acid, tetrahydrophthalic acid or the anhydrides of these acids, in a manner which is known per se.

Those higher molecular weight polyhydroxypolyethers in which high molecular weight polycondensates or polymers are present in finely disperse, dissolved or grafted form are also suitable, but less preferred. Such modified polyhydroxy compounds are obtained, for example, by allowing polyaddition reactions (for example reactions between polyisocyanates and compounds containing amino functional groups) or polycondensation reactions (for example between formaldehyde and phenols and/or amines) to proceed in situ in the compounds containing hydroxyl groups. Such processes are described, for example, in DE-AS (German Published Specification) 1,168,075 and 1,260,142, and DE-OS (German Published Specification) 2,324,134, 2,423,984, 2,512,385, 2,513,815, 2,550,796, 2,550,797, 2,550,833, 2,550,862, 2,633,293 and 2,639,254. However, according to U.S. Pat. No. 3,869,413 or DE-OS (German Published Specification) 2,550,860, it is also possible for a finished aqueous polymer dispersion to be mixed with a polyhydroxy compound and for the water then to be removed from the mixture.

Polyhydroxy compounds modified by vinyl polymers, such as are obtained, for example, by polymerization of styrene and acrylonitrile in the presence of polyethers (U.S. Pat. Nos. 3,383,351, 3,304,273, 3,523,093 and 3,110,695; and DE-Auslegeschriften (German Published Specifications) 1,152,536) or polycarbonate-polyols (German Patent Specification) 1,769,795; and U.S. Pat. No. 3,637,909), are also suitable as component b) for the process according to the invention. If polyether-polyols which have been modified in accordance with DE-OS (German Published Specification) 2,442,101, 2,644,922 and 2,646,141 by graft polymerization with vinylphosphonic acid esters and if appropriate (meth)acrylonitrile, (meth)acrylamide or (meth)acrylic acid esters containing OH functional groups are used, plastics having a particular flame retardancy are obtained.

Representative compounds of component b) are described, for example, in High Polymers, Vol. XVI, "Polyurethanes, Chemistry and Technology", published by Saunders-Frisch, Interscience Publishers, New York, London, Volume I, 1962, pages 32–42 and pages 44–54 and Volume II, 1964, pages 5–6 and 198–199, and in Kunststoff-Handbuch (Plastics Handbook, Volume VII, Vieweg-Hochtlen, Carl-Hanser-Verlag, Munich, 1966, for example on pages 45–71.

Compounds which are furthermore suitable as component b) or some of component b) are polyether-polyamines containing terminal aromatic primary amino groups, such as are accessible, for example, in accordance with the processes described in European Patent Specification A-79,536, DE-OS (German Published Specification) 2,948,419, DE-OS (German Published Specification) 2,019,432, DE-OS (German Published Specification) 2,619,840, U.S. Pat. No. 3,808,250, U.S. Pat. No. 3,975,426 or U.S. Pat. No. 4,016,143.

Component b) can moreover also contain low molecular weight aromatic diamines as mixing components in accordance with the comments made above. Preferred diamines here are aromatic diamines, such as 1,4-diaminobenzene, 2,4-diaminotoluene, 2,4'- and/or 4,4'-diaminodiphenyl methane or, preferably, those diamines which contain at least one alkyl substituent in each case in an ortho-position relative to the amino groups, preferably those which contain at least one alkyl substituent in the ortho-position relative to the first amino group and two alkyl substituents, having in each case 1 to 3 carbon atoms, in the ortho-position relative to the second amino group, and more preferably those which contain an ethyl, n-propyl and/or iso-propyl substituent in each case in at least one ortho-position relative to the amino groups, and if appropriate methyl substituents in further ortho-positions relative to the amino groups. These preferred diamines include 2,4-diaminomesytylene, 1,3,5-triethyl-2,4-diaminobenzene, 1,3,5-triisopropyl-2,4-diaminobenzene, 1-methyl-3,5-diethyl-2,4-diaminobenzene, industrial mixtures thereof with 1-methyl-3,5-diethyl-2,6-diaminobenzene, 4,6-dimethyl-2-ethyl-1,3-diaminobenzene, 3,5,3',5'-tetraethyl-4,4'-diamino-diphenylmethane, 3,5,3',5'-tetraisopropyl-4,4'-diaminodiphenylmethane or 3,5-diethyl-3',5'-diisopropyl-4,4'-diaminodiphenylmethane. Any desired mixtures of such aromatic diamines can likewise be employed.

However, component b) in a particularly preferred embodiment comprises exclusively of polyols of the type mentioned as examples of molecular weight range from 62 to 6000 and having a hydroxyl functionality of 2 to 4 and an OH number range from 1806 to 28.

Component b) is present in the system according to the invention in an amount such that 0.1 to 0.9 groups of component b) which are reactive towards isocyanate groups are present for each isocyanate group of component a).

Component c) comprises plasticizers usually employed in plastics technology, with the proviso that at least one of the (non-reactive) plasticizers forms a a two-phase or multi-phase system in the hardened stage.

Examples of suitable plasticizer c1) are those which are based on phosphorus and/or phthalic acid ester and/or glycerol esters and/or alkysulfonic acid esters, e.g., triethyl phosphate, diethyl phthalate, dibutyl phthalate, triacetin, trioctyl phosphate and trichloroethyl phosphate.

While as suitable plasticizers c2), for example, Marlican, isododecylbenzene, alkylbenzenes, nonylanisoles, alkyl-stearates, alkyl sulphonic acid esters and long chain alkyl acetates are preferably used.

The co-use of plasticizers c2) is essential to the invention, since precisely this type of compound initially gives homogeneous mixtures after mixing of the reactive systems according to the invention. In the course of the polyaddition reaction, however, these compounds are deposited again colloidally in the network and result in shaped articles having the outstanding properties described.

The auxiliaries and additives d) also to be used optionally (if appropriate) include tertiary amines as additional catalysts, and also, for example, blowing agents, surface-active substances, foam stabilizers, anti-settling agents if fillers are additionally used and internal mold release agents.

Examples of suitable blowing agents are water, methylene chloride, monofluorotrichloromethane, dichlorodifluoromethane, chlorodifluoromethane and also inert gases, such as, for example, nitrogen, air or carbon dioxide. If such inert gases are used, the reaction mixture is "charged with gas" by incorporating the gas into the mixture of components b) to d) in an amount of in general at least 10 by volume, preferably in general at least 20 by volume (based on normal pressure), by means of a Venturi nozzle or by means of a hollow stirrer (in accordance with DE-OS (German Published Specification) 3,244,037).

Surface-active substances which are useful herein are compounds which serve to assist the homogenization of the starting substances. Examples which may be mentioned are the sodium salts of fatty acids and salts of fatty acids with amines, for example oleic acid diethylamine salt or stearic acid diethanolamine salt.

Foam stabilizers which are useful herein are, above all, water-soluble polyethersiloxanes. These compounds are in general built up so that a copolymer of ethylene oxide and propylene oxide is bonded to a polydimethylsiloxane radical. Such foam stabilizers are described, for example, in U.S. Pat. No. 2,764,565.

The amount of blowing agents, surface-active substances and foam stabilizers is in general below 15, preferably not more than 10 by weight, based on the total weight of components a) to c).

The auxiliaries d) optionally include the internal mold release agents known per se, such as are described, for example, in DE-OS (German Published Specification) 1,953,637 U.S. Pat. No. 3,726,952 DE-OS (German Published Specification) 2,121,670 British Patent Specification 1,365,215), DE-OS (German Published Specification) 2,431,968 U.S. Pat. No. 4,098,731) and in DE-OS (German Published Specification) 2,404,310 U.S. Pat. No. 4,058,492) Preferred release agents are the salts, having at least 25 aliphatic carbon atoms, of fatty acids having at least 12 aliphatic carbon atoms and primary mono-, di- or polyamines having two or more carbon atoms or amines containing amide or ester groups, the saturated and/or unsaturated esters, having at least one primary, secondary or tertiary amino group and containing COOH and/or OH groups, of mono- and/or polyfunctional carboxylic acids and polyfunctional alcohols having hydroxyl or acid numbers of at least 5, ester-like reaction products of castor oil acid and long-chain fatty acids, salts of carboxylic acids and tertiary amines, as well as naturally occurring and/or synthetic oils, fats or waxes.

The oleic acid or tall oil fatty acid salt of the amine containing amide groups, which has been obtained by reaction of N-dimethylaminopropylamine with oleic acid or tall oil fatty acid, or the salt of 2 mol of oleic acid and 1 mol of 1,4-diaza-bicyclo-(2,2,2)-octane are particularly preferred.

In addition to these release agents which are mentioned as examples and are preferably to be employed, on principle other release agents known per se from the prior art can be used by themselves or as a mixture with the preferred release agents mentioned as examples in the process according to the invention. These release agents which are furthermore suitable include, for example, the reaction products of fatty acid esters and polyisocyanates according to DE-AS (German Published Specification) 2,307,589, the reaction products of polysiloxanes containing reactive hydrogen atoms with mono- and/or polyisocyanates according to DE-OS (German Published Specification) 2,356,692 (which is equivalent to U.S. Pat. No. 4,033,912), esters of polysiloxanes containing hydroxymethyl groups with mono- and/or polycarboxylic acids according to DE-OS (German Published Specification) 2,363,452 which is equivalent to U.S. Pat. No. 4,024,090), and salts of polysiloxanes containing amino groups and fatty acids according to DE-OS (German Published Specification) 2,427,273 or DE-OS (German Published Specification) 2,431,968 (U.S. Pat. No. 4,908,731).

The internal mold release agents mentioned are employed, if at all, in an amount of up to 10% by weight in total, preferably up to 6% by weight, based on the total reaction mixture.

Examples of other additives d) which are also to be used if appropriate are fillers, water-absorbing agents, such as zeolites, dyestuffs, pigments and flameproofing agents.

Examples which may be mentioned of fillers, especially reinforcing fillers, are: silicatic minerals, for example layered silicates, such as antigorite, serpentine, hornblend, amphibiles, chrysotile and talc; metal oxides, such as kaolin, aluminium oxides, titanium oxides and iron oxides, metal salts, such as chalk and baffle, and organic pigments, such as phthalocyanine complex and glass flour and the like. Naturally occurring and synthetic fibrous materials, such as keuflar, C fibers, wollastonite and in particular glass fibers of various lengths, which can be sized if appropriate, are preferably used.

Fillers can be used individually or as a mixture. An additional use of antisettling agents may be advantageous here.

The fillers are advantageously added, if at all, to the reaction mixture in amounts of up to 70% by weight, preferably up to 30% by weight, based on the weight of components a) to c).

Examples of suitable flameproofing agents are tricresyl phosphate, tris-2-chloroethyl phosphate, tris-chloropropyl phosphate, tris-2,3-dibromopropyl phosphate and triphenyl phosphate.

In addition to the halogen-substituted phosphates already mentioned, it is also possible to use inorganic flameproofing agents, such as hydrated aluminum oxide, ammonium polyphosphate and calcium sulphate. In general, it has proved advantageous to use up to 25% by weight of the flameproofing agents mentioned, based on the sum of components a) to d).

More detailed information on the customary auxiliaries and additives is to be found in the technical literature, for example in the monograph by J. H. Saunders and K. C. Frisch "High Polymers" Volume XVI, Polyurethanes, part 2 and, Verlag Interscience Publishers 1962 and 1964.

To prepare the reactive systems according to the invention, components a) to d) are mixed with one another at a temperature below 60° C., preferably below 40° C. In the case of mixtures which react slowly, it is possible here for all the individual components to be mixed manually and for this mixture then to be cast. However, in a preferred procedure the polyisocyanate component a) is mixed with a previously prepared mixture of polyol component b) with the plasticizer mixture c), where it is possible for the auxiliaries and additives d) also used if appropriate to be admixed either with component a) or with the mixture of components b) and c) (if they are compatible with the particular components) or also to be metered separately into the mixture.

The clearpoint of the filler-free mixtures is as a rule reached immediately after mixing. Only after the temperature exceeds about 60° C. because of the heat of reaction and/or by heating the system does a significant acceleration in the solidification reaction take place and a two-phase structure occurs. The systems according to the invention are therefore particularly suitable for the production of shaped articles, where it is possible for the drop time and pour time to be adapted to suit the particular field of use. As a result of the polyurethane formation which proceeds initially and the subsequent trimerization of the excess NCO groups, hardly any weighing errors can be made by the user.

The reactive systems according to the invention can be processed according to the invention to give massive or foamed cast articles or moldings. Insulating bars for window profiles, rolls, rollers, bowling balls, skittles, filter sheets, housings and pallets are examples of possible uses of the resulting materials. Since very large wall thickness can be realized without problems, these materials are also suitable for production of thick sheets. The production of models, for example in the dental laboratory sector, as impression compositions, duplicating compositions or as a substitute for gypsum is also possible, as is the production of laminated materials. The resins according to the invention can be employed as impregnating, casting and laminating resins, and also as molding compositions (filled or non-filled).

If they are used for the production of laminated materials, glass fibers, carbon fibers or aramid fibers are impregnated to form pregregs.

EXAMPLES

The subject-matter of the invention is to be explained in more detail with the aid of the following examples.

EXAMPLE 1

120 parts by weight of a mixture of 60% of 2,4'-diisocyanatodiphenylmethane and 40% of 4,4'-diisocyanatodiphenylmethane (NCO content=33.6 (MDI) were mixed with 30 parts by weight of the diglycidyl ether of bisphenol A (epoxide number=0.5) and 1.5 ml of a separately prepared 1M solution of methyl p-toluenesulphonate in the above mentioned diisocyanate mixture (MDI), and the resultant mixture was heated at 120° C. for 30 minutes under nitrogen, while stirring. After cooling, a reactive resin having the following characteristic data is obtained:

% NCO=26.2 (based on the total mixture)
Viscosity $\eta 25°$ C.=55 mPa.s

EXAMPLE 2

800 parts by weight of a mixture of 60% of 2,4'-diisocyanatodiphenylmethane and 40% of 4,4'-diisocyanatodiphenylmethane (NCO content=33.6 were mixed with 200 parts by weight of the diglycidyl ether of bisphenol A (epoxide number=0.585) and 0.1 ml of dimethyl-benzylamine at 50° C. and the mixture was then heated to 120° C. The slightly exothermic reaction indicate the immediate start of the isocyanurate formation. After a reaction time of 2 hours without external heating, the mixture was cooled. An internal temperature of about 90° C. was established during this operation. A sample was taken from the mixture. The sample had an NCO content of 23% of NCO. The reaction was interrupted by addition of 5 ml of stopper solution 15.4 strength by weight solution of methyl p-toluenesulphonate in a mixture of 60% of 2,4'-diisocyanatodiphenylmethane and 40 of 4,4'-diisocyanatodiphenylmethane). The mixture was then stirred at 120° C. for a further 30 minutes. A clear, yellow storage-stable resin which was liquid at 20° C. and had a viscosity at 25° C. of 2100 mPa.s and an NCO content of 21 is formed.

EXAMPLE 3

To prepare a duplicating composition, 100 g of the reactive resin of Example 1 as component A were mixed with 100 g of component B (for the composition, see below).

The resultant composition which was stirred manually became clear after approximately 15 seconds. The mixture then heated up and became dispersed after 185 seconds and free from tackiness after 220 seconds. The processing time was about 3 minutes. The NCO excess (characteristic FIG. 164) reacted completely during subsequent heating at 120° C. in the course of 16 hours (monitoring via the IR spectrum).

| The composition had the following properties: | |
|---|---|
| Glass transition temperature | 123° C. |
| Martens point | 77° C. |
| Shore D hardness | 79 |
| Impact strength | 15 KJ/m$^2$ |
| Flexural strength | 77 N/mm$^2$ |
| Outer fiber strain | 5.28% |
| E modulus from the bending test | 1806 N/mm$^2$ |
| Composition of component B | |
| 35 | parts by weight of a polyether of OH number 630 (prepared from ethylenediamine and propylene oxide), |
| 15 | parts by weight of trichloroethyl phosphate, |
| 20 | parts by weight of trioctyl phosphate, |
| 30 | parts by weight of Marlican (n-dodecylbenzene), |
| 3 | parts by weight of Baylith phase (drying agent) and |
| 0.1 | part by weight of Byk 053 (foam suppressant) |

EXAMPLE 4

100 g of the reactive resin from Example 2 as component A were stirred manually with 100 g of component B from Example 3. The mixture became clear after 20 seconds and then exothermed, disperse after 150 seconds and became free from tackiness after 240 seconds. The processing time was about 140 seconds. The NCO excess (characteristic FIG. 131) reacted completely during subsequent heating at 120° C. in the course of 16 hours (monitoring via the IR spectrum)

| The composition had the following properties: | |
|---|---|
| Glass transition temperature | 122° C. |
| Martens point | 62° C. |
| Shore D hardness | 79 |
| Impact strength | 18 KJ/m$^2$ |
| Flexural strength | 79 N/mm$^2$ |
| Outer fiber strain | 5.29% |

| -continued | |
|---|---|
| The composition had the following properties: | |
| E modulus from the bending test | 1790 N/mm² |

EXAMPLE 5

100 g of the reactive resin from Example 2 were stirred manually with 100 g of a mixture of
- 35 parts by weight of a polyether of OH number 630 (prepared from ethylenediamine and propylene oxide),
- 30 parts by weight of marlicane (n-dodecylbenzene),
- 35 parts by weight of dibutyl phthalate and
- 0.3 part by weight of Byk 053 (foam suppressant).

The composition became clear after 20 seconds and then exothermed, disperse after 150 seconds and became free from tackiness after 210 seconds. The processing time was 165 seconds.

EXAMPLE 6

100 g of the reactive resin from Example 2 are stirred manually with 100 g of a mixture of
- 55 parts by weight of a Polyether of OH number 470 (prepared from ethylenediamine and propylene oxide),
- 30 parts by weight of marlicane (n-dodecylbenzene) and 35 parts by weight of diethyl phthalate.

EXAMPLE 7

100 g of the reactive resin from Example 2 were stirred manually with 165 g of a mixture of
- 35 parts by weight of a polyether of OH number 630 (prepared from ethylenediamine and propylene oxide),
- 60 parts by weight of marlicane (n-dodecylbenzene) and
- 70 parts by weight of diethyl phthalate.

The compositions according to Examples 6 and 7 became clear after 25 seconds and then exothermed, dispersed after 4 minutes and became free from tackiness after 6 minutes. The processing time was 5 minutes. These examples show that metering errors are largely compensated for.

EXAMPLE 8 (comparison example)

100 g of the reactive resin from Example 2 were stirred manually with 165 g of a mixture of
- 35 parts by weight of a polyether of OH number 630 (prepared from ethylenediamine and propylene oxide) and
- 130 parts by weight of diethyl phthalate.

The mixture became clear after 20 seconds, and then exothermed, and free from tackiness after 7 minutes. The processing time is 4½ minutes. The composition remained clear, but exhibited exudation during storage and had a significantly lower strength than the composition from Example 7.

What is claimed is:

1. A reactive system comprising:
   a) a storage-stable mixture of (i) a polyisocyanate component comprising at least one organic polyisocyanate and (ii) an epoxide component comprising at least one organic epoxide, the storage stability having been ensured by a heat treatment of the epoxide component (ii) in the presence of an alkylating agent, optionally in the presence of at least some of the polyisocyanate component (i), the ratio of the amounts of components (i) and (ii) being chosen so that 0.005 to 0.4 mol of epoxide groups is present in 100 g of component a),
   b) an NCO-reactive component comprising at least one organic compound which contains at least two to eight groups which are reactive towards isocyanate groups in the sense of an addition reaction and has an OH number range from 28 to 1800, with the proviso that at least 10 percent by weight of component b) comprises a compound containing at least 0.05 mol of tertiary amine nitrogen per 100 g, and
   c) a plasticizer mixture of c1) and c2), in an amount sufficient to form a two-phase or multi-phase system in the hardened stage and is employed in an amount of not more than 200 percent by weight, based on the reactive resin wherein c1) is a phosphorus ester or alkylsulfonic acid ester selected from the group consisting of triethyl phosphate, diethyl phosphate and trichlorethyl phosphate, and c2) is selected from the group consisting of an alkylbenzene, alkyl sulfonic acid, alkyl anisole and long chain alkyl acetate which is characterized in that it initially gives a homogeneous mixture after mixing of the reactive resin, and
   d) optionally an auxiliary and an additive,
   the amount of component b) being chosen so that 0.1 to 0.95 groups of component b) which are reactive towards isocyanate groups are present per isocyanate group of component a).

2. A reactive system comprising:
   a) a storage-stable mixture of (i) a polyisocyanate component comprising at least one organic polyisocyanate and (ii) an epoxide component comprising at least one organic epoxide, which are reacted in the presence of a tertiary amine as a catalyst to give a more highly viscous intermediate product containing oxazolidinone groups and isocyanurate groups, wherein the reaction is interrupted at a conversion of not more than 65% of the isocyanate groups present in the starting mixture of addition of an amount of the alkylating sulphonic acid alkyl ester, at least equivalent to the amount of amine, and wherein the ratio of the amount of components (i) and (ii) being chosen so that 0.005 to 0.4 mol of epoxide groups is present in 100 g of component a),
   b) an NCO-reactive component comprising at least one organic compound which contains at least two to eight groups which are reactive towards isocyanate groups via an addition reaction and has an OH number range from 28 to 1800, with the proviso that at least 10 percent by weight of component b) comprises a compound containing at least 0.05 mol of tertiary amine nitrogen per 100 g, and
   c) a plasticizer mixture of c1) and c2), in an amount sufficient to form a two-phase or multi-phase system in the hardened stage and is employed in an amount of not more than 200 percent by weight, based on the reactive resin, wherein c1) is a phosphorus ester or alkylsulfonic acid ester selected from the group consisting of triethyl phosphate, diethyl phosphate and trichlorethyl phosphate, and c2) is selected from the group consisting of an alkylbenzene, alkyl sulfonic acid, alkyl anisole and long chain alkyl acetate which is characterized in that it initially give a homogeneous mixture after mixing of the reactive systems and d) optionally an auxiliary and an additive, the amount of component b) being chosen so that 0.1 to 0.95 groups of component b) which are reactive towards isocyanate groups are present per isocyanate group of component a).

3. A reactive system according to claim 1 characterized in that the polyisocyanate component (i) present in component
   a) is a polyisocyanate or polyisocyanate mixture of the diphenylmethane series which is liquid at room temperature or a derivative of such a polyisocyanate or polyisocyanate mixture which is liquid at room temperature.

4. A reactive system according to one of claim 1, characterized in that component a) comprises at least one organic polyhydroxy compound having a hydroxyl functionality of 2 to 4 and a molecular weight of 62 to 12000 and contains 0.5 to 12 weight of tertiary nitrogen.

5. A reactive system according to claim 1, characterized in that component c) contains at least one plasticizer based on (iso)alkylbenzenes, and another plasticizer based on phosphorus and/or phthalic acid esters and/or glycerol esters and/or alkylsulfonic acid esters.

6. A process for the preparation of a foamed polyurethane plastic containing isocyanurate groups, characterized in that a reactive system comprising
   a1) a storage-stable mixture or (i) a polyisocyanate component comprising at least one organic polyisocyanate and (ii) an epoxide component comprising of at least one organic epoxide, the storage stability having been ensured by a heat treatment of the epoxide component (ii) in the presence of an alkylating agent, and optionally carried out in the presence of at least some of the polyisocyanate component (i), the ratio of the amounts of components (i) and (ii) being chosen so that 0.005 to 0.4 mol of epoxide groups is present in 100 g of component a), or
   a2) a storage-stable mixture of (i) a polyisocyanate component comprising at least one organic polyisocyanate and (ii) an epoxide component comprising at least one organic epoxide, which are reacted in the presence of a tertiary amine as the catalyst to give a higher viscosity intermediate product containing oxazolidinone groups and isocyanurate groups, wherein the reaction is interrupted at a conversion of not more than 65% of the isocyanate groups present in the starting mixture by addition of an amount of the alkylating sulphonic acid alkyl ester at least equivalent to the amount of amine, and wherein the ratios of the amounts of components (i) and (ii) being chosen so that 0.005 to 0.4 mol of epoxide groups is present in 100 g of component a),
   b) and NCO-reactive component comprising at least one organic compound which contains at least two to eight groups which are reactive towards isocyanate groups in via an addition reaction and has an OH number range from 28 to 1800, with the proviso that at least 10 percent by weight of component b) comprises a compound containing at least 0.05 mol of tertiary amine nitrogen per 100 g, and
   c) a plasticizer mixture of c1) and c2), in an amount sufficient to form a two-phase or multi-phase system in the hardened stage and is employed in an amount of not more than 200 percent by weight, based on the reactive resin, wherein c1) is a phosphorus ester or alkylsulfonic acid ester selected from the group consisting of triethyl phosphate, diethyl phosphate and trichlorethyl phosphate, and c2) is selected from the group consisting of an alkylbenzene, alkyl sulfonic acid, alkyl anisole and long chain alkyl acetate which is characterized in that it initially gives a homogeneous mixture after mixing of the reactive systems and
   d) an auxiliary agent and an additive, the amount of component b) being chosen so that 0.1 to 0.95 groups of component b) which are reactive towards isocyanate group are present per isocyanate group of component a), is prepared by mixing the individual components, heating the resultant mixture to at least 60° C., and optionally shaping the resulting plastic.

7. A molding composition containing a thermosetting reactive system according to claim 1.

* * * * *